Oct. 12, 1971  KUNIJI ASANO  3,611,764

METHOD AND APPARATUS FOR CONTROLLING ROLLING MILLS

Filed July 15, 1969  5 Sheets-Sheet 1

KUNIJI ASANO
INVENTOR.

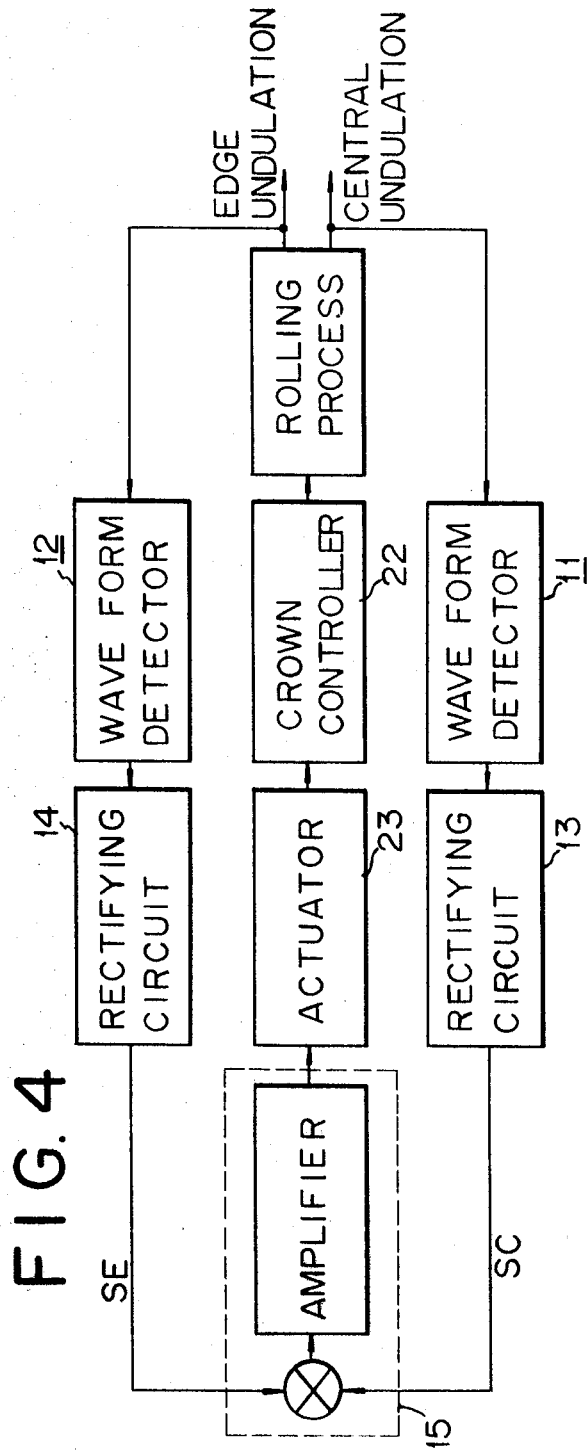

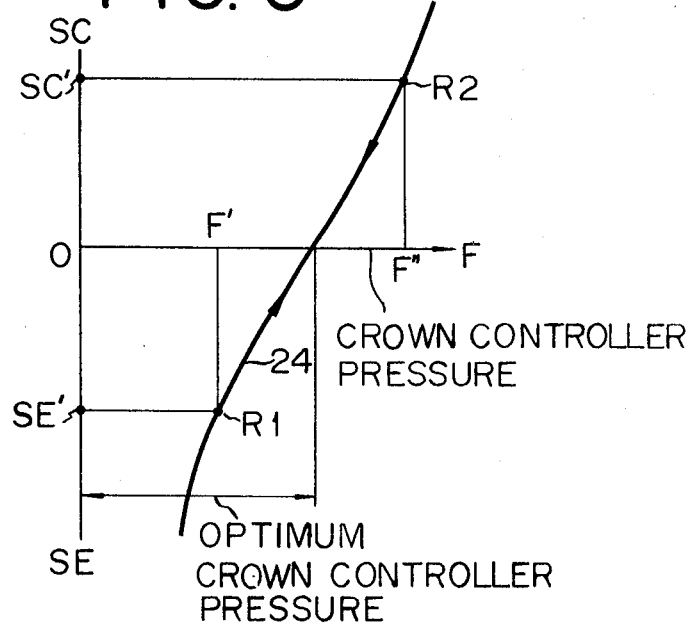
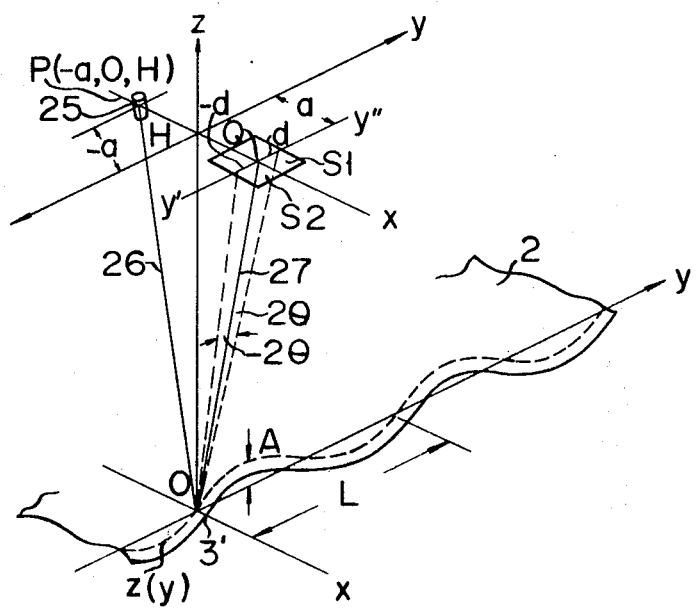

United States Patent Office 3,611,764
Patented Oct. 12, 1971

3,611,764
METHOD AND APPARATUS FOR CONTROLLING ROLLING MILLS
Kunji Asano, Kawasaki-shi, Japan, assignor to Tokyo Shibaura Electric Co., Ltd., Kawasaki-shi, Japan
Filed July 15, 1969, Ser. No. 841,755
Int. Cl. B21b 37/00
U.S. Cl. 72—8                                    10 Claims

ABSTRACT OF THE DISCLOSURE

In a method and apparatus for controlling a rolling mill wherein a crown controller is used to control the crown of the mill rolls and the controller is operated in accordance with the surface contour of the strip, the surface contours at the central portion and edge portion of the strip are measured by photoelectric means to obtain differentiated signals corresponding to respective surface contours and the difference between differentiated signal is utilised to operate the crown controller.

---

This invention relates to a method and apparatus for controlling the crown controller of rolling mills.

In rolling metal strips it is necessary to provide uniform ratio of undulation in order to produce strips of desired configuration and flatness. Thus, partial difference in the ratio of undulation results in the surface irregularity or wave of the strip. These waves may be classified into two, i.e., the "central undulations" which are created at the transversal centre of the strip and the "edge undulations" created at opposite sides of the strip. To prevent occurrence of such central undulation and edge undulation, it has been used in a pair of crown rolls. However, until today any satisfactory method of controlling such crown rolls has not been provided. The term "crown roll," as used herein, denotes the type, the central portion of which generally projects outward, as well as a simple cylindrical type.

It is therefore an object of this invention to provide a method and apparatus capable of measuring surface irregularities such as the edge undulation and the central undulation created in rolled strips without touching the same.

According to this invention surface contours representing the surface irregularities at the central and edge portions of rolled strips are detected optically and the detected signals are used to automatically control the crown controller of the rolling mill to prevent creation of edge undulations and central undulations.

This invention can be more fully understood from the following detailed description when taken in connection with reference to the accompanying drawings, in which:

FIGS. 1A, 1B and 1C are perspective views to aid understanding of this invention wherein FIG. 1A shows the manner of creating edge undulations, FIG. 1B shows a strip with edge undulations and FIG. 1C shows a strip with central undulation;

FIG. 4 is a connection diagram of the control device utilised in the arrangement of FIG. 3;

FIG. 5 is a graph to explain the operation of the control device shown in FIG. 3;

FIG. 6 is a diagrammatic perspective view of the contour detector utilised in the device shown in FIG. 3;

In order to have better understanding of this invention the manner and process of creating undesirable surface irregularities in rolled strips will first be described by referring to FIGS. 1A, 1B and 1C.

Figure 1A:
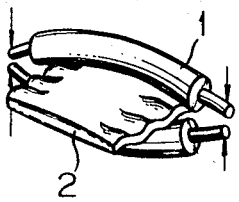
Figure 1B:
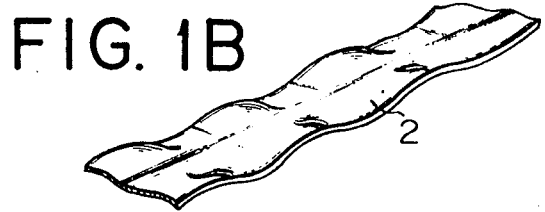
Figure 1C:
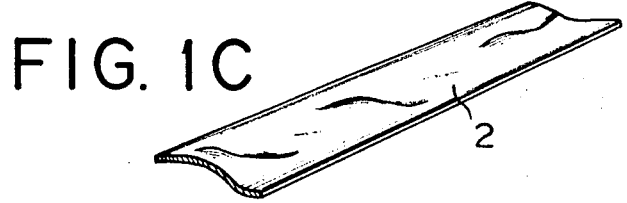
Figure 2:
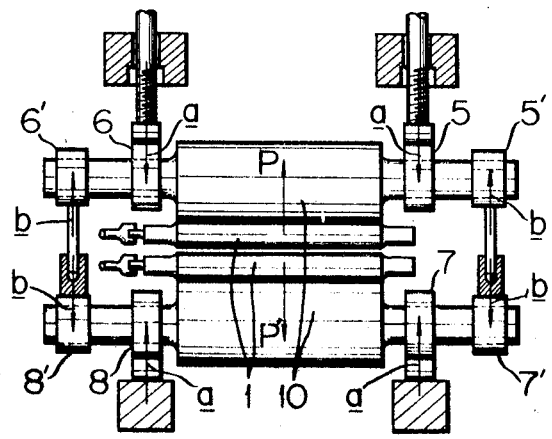
FIG. 2 is a front elevation of a conventional strip mill.

As shown in FIG. 1A, when a pair of working rolls 1 are deflected outwardly the rolled strip will have wavy irregularities at the oppoiste edges or the so-called edge undulations. Whereas, when the working rolls are deflected inwardly to remove these edge undulations central undulations will be formed at the central portion of the strip as shown in FIG. 1C. In order to prevent occurrence of such central undulations and edge undulations it is necessary to suitably control the degree of flexure of the working rolls. To this end, a rolling mill equipped with a crown control device as shown in FIG. 2, is generally utilised. The rolling mill shown in FIG. 2 comprises a pair of working rolls 1, a pair of back-up rolls 10 and means to apply a force of ½P′ in the direction of arrow $a$ to bearing chocks 5, 6, 7 and 8, respectively, and to apply a force F in the direction of arrow $b$ to other bearing chocks 5′, 6′, 7′ and 8′, respectively, so as to apply a resultant force of $(P'/2+F)$ to each roll neck of back-up rolls 10, the force F being suitably controlled to suitably adjust the degree of flexure of the working rolls.

Although a number of devices have been proposed to adjust working rolls in response to the conditions of edge undulations and central undulation of the rolled strip no reliable method and apparatus is available capable of qualitatively detecting wave forms or contours of the edge undulation and central undulation so that it has been impossible to provide automatic crown control in relation to the frequency of occurrence of such irregularities. At present crown control is performed manually by observing the surface irregularities and by relying upon the human vision. Mechanical measurements of surface irregularities have been difficult for the following two reasons.

(1) As the rolling speed of the strip is extremely high, in the order of several hundred to several thousand metres per minute, in order to prevent wear of the measuring device or detector and to avoid scratching of the rolled strip it is desirable to use a non-contact method wherein the detector does not touch the strip.

(2) As the strip is subjected to high tension during rolling the amplitude of surface irregularities is very small thus rendering it difficult to measure their contours.

Thus, prior measuring devices relying upon the operator's vision or feeling can not precisely detect defects of the rolled strips, and since it is very difficult to detect such defects until a later annealing step, in the most adverse condition all the lot must be discarded.

As above described, edge undulations and central undulations are caused by the difference in the ratio of undulation at the centre and edges of the strip. Since the wave forms of the central undulations and of the edge undulations of the rolled strip may be considered as a sine wave they can be represented by $Zc=fc(y)$ and $Ze=fE(y)$, respectively, where $Zc$ and $Ze$ represent the central undulation and the edge undulation, respectively, when the rolling direction in the plane of the rolled strip is represented by the $y$ axis, width direction by the $x$ axis and the direction normal to the $x$–$y$ plane by the $z$ axis, such co-ordinate being shown in FIG. 6.

A small difference in length $D$ of respective waves can be calculated as follows from above equations.

$$D=\left\{\sqrt{1+\left(\frac{\Delta Zc}{\Delta y}\right)^2}-\sqrt{1+\left(\frac{\Delta Ze}{\Delta y}\right)^2}\right\}\Delta y \quad (1)$$

During the normal rolling operation, under the condition wherein the central undulation is created the edge undulation will not be formed and vise versa. Thus, the following equations hold:

where $$\frac{\Delta Zc}{\Delta y} \neq 0, \frac{\Delta Ze}{\Delta y} \doteq 0 \text{ and}$$

where $$\frac{\Delta Ze}{\Delta y} \neq 0, \frac{\Delta Zc}{\Delta y} \doteq 0 \qquad (2)$$

Substituting these into Equation 1, $$D = \left\{ \sqrt{1 + \left(\frac{\Delta Zc}{\Delta y}\right)^2} - 1 \right\} \Delta y$$

or $$D = \left\{ 1 - \sqrt{1 + \left(\frac{\Delta Ze}{\Delta y}\right)^2} \right\} \Delta y \qquad (3)$$

The amplitudes of the central undulation and edge undulation are ordinarily of the order of several microns, their wave length ranges from few centimetres to ten or more centimetres and their wave forms are approximately a sine wave, so that the following relations always hold.

$$\frac{\Delta Zc}{\Delta y} \ll 1 \text{ and } \frac{\Delta Ze}{\Delta y} \ll 1$$

Thus, by approximation, Equation 3 can be rewritten as follows:

Where the central undulation is represented $$D \doteq \tfrac{1}{2} \left(\frac{\Delta Zc}{\Delta y}\right)^2 \cdot \Delta y$$

and where the edge undulation is represented (4)

$$D \doteq \tfrac{1}{2} \left(\frac{\Delta Ze}{\Delta y}\right)^2 \cdot \Delta y$$

This invention is based on Equation 4. As can be noted from this equation, in accordance with this invention there is provided a differential wave detector for the central undulation and the edge undulation and the pressure of crown control associated with the rolling mill is controlled so that the differentiated wave produced by the detector converges to zero, whereby to reduce the difference D in the incremental length of respective waves to prevent occurrence of the central undulation as well as edge undulations.

Figure 3:
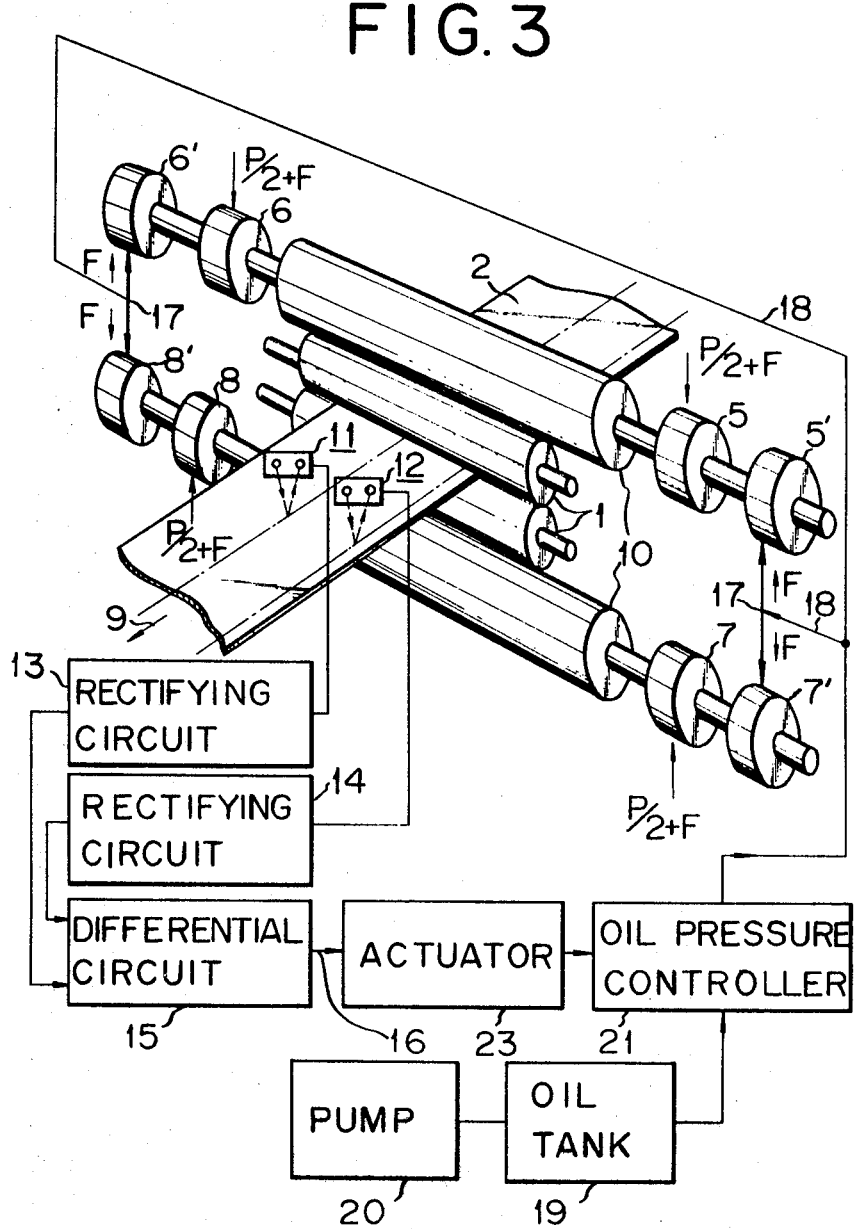
FIG. 3 is a diagrammatic perspective view of the mill together with a block diagram of the control device of one embodiment according to the invention.

One embodiment of the control device constructed in accordance with this invention will be described in detail hereunder with reference to FIG. 3 in which corresponding reference characters represent similar components as in FIGS. 1A to 1C and FIG. 2.

Wave form detectors 11 and 12, described later in more detail are disposed, respectively above the longitudinal centre portion and the edge portion of a rolled metal strip 2 running in the direction of arrow 9. Detector 11 operates to generate an output signal corresponding to the differential $dZc/dy$ of the wave form of the central undulation while detector 12 an output signal corresponding to the differential $dZe/dy$ of the wave form of the edge wave, and these output signals are rectified by rectifying circuits 13 and 14, respectively, to obtain DC signals $$K \frac{dZc}{dy} \text{ and } K \frac{dZe}{dy}$$

respectively, where K represents a constant. These DC signals are applied to a subtracting circuit or a differential circuit 15 to obtain the difference between said DC signals, or a signal 16 of plus or minus sign and representing the surface contour of the strip 2. The signal 16 is applied to a conventional crown controller to adjust the pressure exerted thereby. The crown controller schematically shown in FIG. 3 as block 22, comprises an actuator 23 connected to the differential circuit 15, an oil pressure controller 21 connected to the actuator 23, an oil pressure pump 20 connected to the oil pressure controller 21, an oil tank 19 adapted to supply oil to the pump, conventional oil pressure piston cylinder assemblies 17 adapted to apply force F to bearing chocks 5′, 7′ and 6′ and 8′, respectively, and pipings 18 interconnecting the oil pressure controller 21 to the piston cylinder assemblies. The actuator 23 operates in response to the signal 16 so as to control pressure F through controller 21 to bring signal 16 to zero.

The above described rolling process may be considered as a one input, two output control system with the pressure F of the crown controller utilised as the input and the contours of the edge undulation and the central undulation as the outputs. As a result, the control device can be represented by the block diagram shown in FIG. 4. Assuming now that a servomotor is utilised as actuator 23 the operation of the control device is as follows. In FIG. 5, the abscissa represents the crown controller pressure F while the ordinate the central undulation signals SC from detector 11 and the edge undulation signal SE from detector 12. Curve 24 represents variation of pressure F.

Assume now that an edge undulation is created when pressure F equals F′ so that detector 12 generates signal SE′.

Under this condition, as no central undulation is created as above described, signal SC from detector 11 is zero which is the set value of the control system. The differential signal between detectors 11 and 12 is amplified to drive the servomotor such that crown controller pressure F increases. When pressure F increases beyond F′, point R1 on curve 24 begins to move along it toward the point of zero signal and when the detected signal reaches zero or the optimum rolling condition, the servomotor will be stopped and the system is maintained under these conditions.

On the other hand, where pressure F is equal to F″ representing the presence of a central undulation signal SC′ the edge undulation signal SE will be reduced to zero which is the set value of the control device. Under these circumstances, the servomotor operates in the direction to decrease crown controller pressure F and point R2 begins to move along curve 24 towards the point of zero signal and stops upon reaching the point of zero signal to maintain the optimum crown controller pressure of rolling condition.

In this manner the crown controller is controlled to always eliminate the occurrence of the central undulation and edge undulations. To improve the effectiveness of control the dynamic characteristics of the rolling process are predetermined and an integrating element or a differentiating element, for example, corresponding to such characteristics are incorporated with the amplifier.

FIG. 6 shows one embodiment of the wave detector 12 (detector 11 is identical to detector 12). Inasmuch as the edge undulation and the central undulation are in the form of a sine wave, they are herein treated as a sine wave. However, waves of other wave forms can also be detected. By representing the direction of the rolling of the strip 2 by the y axis and assuming now that the edge undulation has a wave form 3′ and that the end of the strip is cut in a plane of y–z the wave form z(y) of the severed edge undulation can be represented by $$z(y) = A \sin (2/L\pi y) \qquad (5)$$

where A represents the amplitude of the edge undulation and L the wave length thereof.

When a parallel light beam 26 is projected from a light source 25 to the strip 2 or from the point P(−a, O, H) toward the origin O, where z(y)=O, then the light reflected thereby reaches a point Q (a, O, H). However, as z(y) varies according to Equation 5, the reflected light 27 oscillates in the y′–y″ direction about point Q in response to the variation in the value of z(y). The deviation $d$ of the optical axis (reflected light) along $y'-y''$ axis is shown by Equation 6

$$d \doteqdot [H-z(y)] \cdot 2\theta \qquad (6)$$

where $2\theta$ represents the angle between the deviated optical axis shown by dotted lines and the $x-z$ plane.

Since $\theta$ represents the inclination $dz(y)/dy$ of the reflecting plane for the light flux, from Equations 5 and 6

$$d=[H-z(y)] \cdot \frac{4\pi}{L} A \cos \frac{2\pi}{L} \cdot y \qquad (7)$$

Photoelectric converters S1 and S2 are disposed in symmetric relationship with respect to $x$ axis passing through point Q to receive the oscillating reflected light flux and the outputs from the photoelectric converters are amplified by a differential amplifier, for example. Then this amplifier provides a signal wave having an amplitude proportional to $dz(y)/dy=Z'(y)$. Thus the wave form $z(y)$ of the edge undulation is detected quantitatively. In the force going Equations 1 to 4 $dz(y)$ is represented by $\Delta Ze$ (in the case of edge undulation) while $dy$ is represented by $\Delta y$.

Assuming now that $K'(\mu A/lx \cdot mm.^2)$ represents the sensitivity of the photoelectric converters S1 and S2, $E(lx)$ the brightness on the photoelectric converters and $\Delta S$ the difference between light receiving areas of respective photoelectric converters when the optical axis 27 deviates by $d$, then the output current Iout from the differential amplifier will be given by $$\text{Iout}=K' \cdot E \cdot \Delta S \qquad (8)$$

In this example if it is assumed that the configuration of the parallel light 26 is a rectangle having a length $l$ along the $x$ axis and a width $w$ along the $y$ axis, that the intensity of the parallel light is uniform and that the reflected light flux 27 is deviated by $d$ from the interface $x-x$ between photoelectric converters S1 and S2 then the difference $\Delta S$ between light receiving areas will be given by Equation 9

$$\Delta S=2dl \qquad (9)$$

By substituting Equations 7 and 9 into Equation 8, Equation 10 can be obtained expressing the output current Iout from the differential amplifier.

$$\text{Iout}=\frac{8\pi AK'El}{L}[H-z(y)] \cos \frac{2\pi}{L} y \qquad (10)$$

By substituting a condition $A \ll H$ into Equation 10, we obtain $$\text{Iout}=\frac{8\pi AK'ElH}{L} \cos \frac{2\pi}{L} y \qquad (10')$$

Ordinarily following values are obtained for respective reference characters.

$K'=6.5 \times 10^{-3} \mu A/lx \cdot mm.^2$
$l=20$ mm.
$E=100lx$
$L=100$ mm.
$H=1m, 2m, 3m$
$A=1\mu$ By substituting these values into Equation 10' for respective values of H (the distance between the optical detecting system and the rolled strip 2), the following values of output currents can be obtained.

TABLE

| H=1m | H=2m | H=3m |
|---|---|---|
| Iout=3.26 μA | Iout=6.52 μA | Iout=10.73 μA |

These values of output currents are sufficiently large to be amplified by the amplifier and their wave form represents the differentiated wave form $z'(y)$ of $z(y)$ at high fidelities.

While in the foregoing embodiment it was assumed that $z(y)$ takes the form of a sine wave, where $z(y)$ is not a sine wave it is possible to readily obtain the original wave form $z(y)$ by integrating the wave form $z'(y)$.

Figure 7:
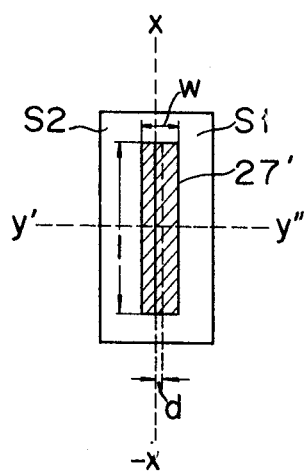
FIG. 7 is an enlarged front elevation of the light receiver of the contour detector shown in FIG. 6.

When plotting FIG. 7 it is assumed that the brightness at photoelectric detectors S1 and S2 was $100lx$, but such a brightness can be attained very easily. Thus, for example, when a laser light of 0.5 mw. is utilised as the light source 25 and when the area of the parallel beam 26 is selected to be 1 cm.², the brightness provided can be expressed by $$E_O=680 \times 0.5 \times 10^{-3} \times 10^4=3400lx$$

The surface of the cold rolled strip 2 is highly reflective like a mirror surface but even where 90% of the light is lost when it travels from source 25 to the light receiving surface, the brightness at the light receiving surfaces of photoelectric converters S1 and S2 would be $340lx$ which is sufficiently high for practical use.

Figure 8C:
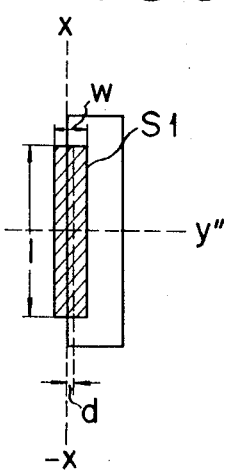
FIGS. 8A, 8B and 8C show modified embodiments of the light receiver.
Figure 8A:
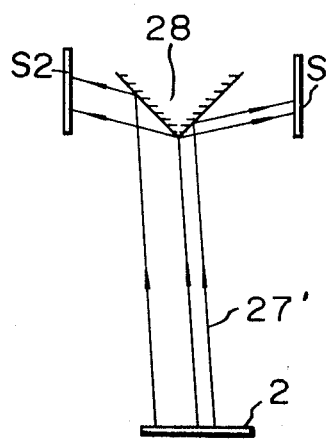
Figure 8B:
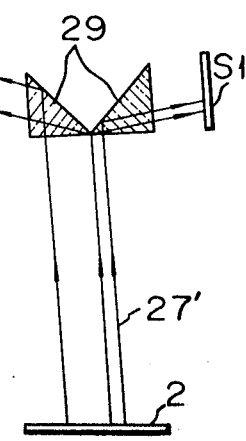

Further, although in the above described embodiment the reflected light flux 27 was received directly by photoelectric receivers S1 and S2, as shown in FIG. 8A, a triangular reflecting mirror 28 may be interposed between photoelectric converters S1 and S2 and the rolled strip 2. Alternatively, as shown in FIG. 8B, two prisms 29 may be substituted for reflecting mirror 28. Further, as shown in FIG. 8C, one of the photoelectric converters S2 may be omitted. However, in this case an ordinary amplifier can be substituted for the differential amplifier having a sensitivity ½ of that of the detector system shown in FIG. 6. Variation in the light source may cause detector errors since, where two photoelectric converters are utilised to obtain the differential signal, when, in Equation 8, $\Delta S$ equals zero (no edge undulation and central undulation) output current Iout will be zero not withstanding the variation in the brightness, thus eliminating variations in the light source, whereas in the case of only one photoelectric converter, variations in the light source, results in the error of the output Iout.

Thus, in accordance with this invention wave forms of edge undulations and central undulations of a rolled strip are detected without contacting the same so that the detected signal is used to control the crown controller pressure so as to eliminate such surface irregularities, thus providing an effective and automatic control for crown controllers. Furthermore, according to this invention even wave forms of very small amplitudes can be detected at high fidelities thus enabling to produce perfectly flat strips.

What is claimed is:

1. In a method of controlling a rolling mill wherein a crown controller is used to control the crown mill rollers and said controller is operated in accordance with the surface contour of the rolled strip the improvement which comprises the steps of:
   optically detecting surface contours at the central portion and at the edge portion of said strip;
   generating signals corresponding to the differential of said respective optically detected surface contours;
   generating a difference signal which is a function of the difference between said differential signals to obtain a control signal; and
   controlling an actuator for said crown controller in response to said control signal so as to control the crown of said mill rolls such that said control signal is reduced to zero.

2. A method according to claim 1 wherein said differential signal is produced by projecting light rays from independent light sources to the central portion and edge portion, respectively of said strip and by receiving reflected light rays to generate electrical signals representing the differential of the wave of the surface contours of said strip.

3. In a control device for a strip mill wherein a crown controller adapted to control the crown of the mill rolls is operated in accordance with the surface contour of a strip rolled by said rolling mill, the improvement which comprises:
  means to optically detect the surface contours at the central portion and the edge portion, respectively of said rolled strip and for generating differential signals corresponding to the differential of said respective surface contours of said strip;
  means connected to said detecting and generating means to generate a difference signal which is a function of the difference between said differential signals to obtain a control signal representing the surface contours of said strip; and
  an actuator responsive to said control signal to control said crown controller thus controlling said crown of said mill rollers to reduce said control signal to zero.

4. An apparatus according to claim 3 wherein said detecting and generating means comprises two light sources arranged to project light rays to the central portion and edge portion, respectively, of said strip, and two photoelectric converters arranged to receive light rays reflected from said respective portions, each of said photoelectric converters including two independent portions to receive said reflected light rays to generate an electrical signal corresponding to the differential of the respective surface contour of said strip.

5. An apparatus according to claim 4 wherein said two independent portions are contiguous.

6. An apparatus according to claim 4 wherein said two independent portions are arranged in spaced apart parallel relationship and including a triangular reflecting mirror disposed between said independent portions to direct said reflected light rays toward said respective independent portions.

7. An apparatus according to claim 4 wherein said two independent portions are arranged in spaced apart parallel relationship and including a pair of prisms disposed between said independent portions to direct said reflected light rays toward said respective independent portions.

8. An apparatus according to claim 4 wherein said light sources are laser light sources.

9. A method according to claim 1 including amplifying said difference signal to obtain said control signal.

10. An apparatus according to claim 3 including means for amplifying said difference signal to obtain said control signal.

References Cited

UNITED STATES PATENTS

| | | | |
|---|---|---|---|
| 3,474,668 | 10/1969 | Mangan | 73—159 |
| 3,187,185 | 6/1965 | Milnes | 250—222 |
| 3,416,340 | 12/1968 | Reesor | 72—12 |
| 3,442,104 | 5/1969 | Misaka et al. | 72—9 |
| 3,496,744 | 2/1970 | Mizuno et al. | 72—12 |
| 3,509,751 | 5/1970 | Shiraiwa et al. | 72—16 |
| 3,531,960 | 10/1970 | Stone | 72—245 X |

MILTON S. MEHR, Primary Examiner

U.S. Cl. X.R.

356—200; 73—159; 72—11